United States Patent [19]
Tsujimoto

[11] Patent Number: 5,646,958
[45] Date of Patent: Jul. 8, 1997

[54] DECISION FEEDBACK EQUALIZER FOR CANCELING SHORT-AND LONG-MULTIPATH COMPONENTS USING CORRESPONDINGLY DELAYED DECISION SYMBOLS

[75] Inventor: Ichiro Tsujimoto, Tokyo, Japan

[73] Assignee: NEC Corporation, Tokyo, Japan

[21] Appl. No.: 577,009

[22] Filed: Dec. 26, 1995

[30] Foreign Application Priority Data

Dec. 26, 1994 [JP] Japan .................................. 6-322641

[51] Int. Cl.$^6$ .............................. H03H 7/30; H03H 7/40
[52] U.S. Cl. .............................. 375/233; 375/232
[58] Field of Search .............................. 375/233, 232, 375/346, 347, 348, 349

[56] References Cited

U.S. PATENT DOCUMENTS

| | | | |
|---|---|---|---|
| 4,789,994 | 12/1988 | Randall | 375/12 |
| 5,119,401 | 6/1992 | Tsujimoto | 375/14 |
| 5,228,058 | 7/1993 | Ushirokawa | 375/14 |
| 5,345,476 | 9/1994 | Tsujimoto | 375/14 |
| 5,367,536 | 11/1994 | Tsujimoto | 375/42 |
| 5,440,583 | 8/1995 | Koike | 375/233 |
| 5,524,023 | 6/1996 | Tsujimoto | 375/232 |

FOREIGN PATENT DOCUMENTS

0 604 956  7/1994  European Pat. Off. .

*Primary Examiner*—Stephen Chin
*Assistant Examiner*—Mohammad H. Ghayour
*Attorney, Agent, or Firm*—Foley & Lardner

[57] ABSTRACT

In a decision feedback equalizer, transmitted signals are received by an array of antennas and baseband symbols are recovered. A forward filter provides weighting of the recovered baseband symbols with first coefficients so that precursor multipath components of a transmitted symbol are canceled and combines the weighted symbols. A set of first delay elements provide respective delays to one of the baseband symbols to produce a short- and a long-delayed baseband symbol. A set of correlators is provided for detecting correlations between the baseband symbol and the short- and long-delayed baseband symbols. A set of second delay elements provide respective delays to a decision symbol to produce a short- and a long-delayed decision symbol. A selector is responsive to a correlation detected by one of the correlators for selecting one of the short- and long-delayed decision symbols. A feedback filter shifts the selected decision symbol along a tapped-delay line to produce successively shifted decision symbols, multiplies them with second coefficients and combines the multiplied decision symbols to produce an output signal that cancels postcursor multipath components of the transmitted symbol. The output signals of the forward and feedback filters are combined to produce a pre-decision symbol which is used by a decision circuit to produce a decision output for coupling to the second delay elements as the aforesaid decision symbol.

7 Claims, 4 Drawing Sheets

DECISION FEEDBACK EQUALIZER FOR CANCELING SHORT- AND LONG-MULTIPATH COMPONENTS USING CORRESPONDINGLY DELAYED DECISION SYMBOLS

BACKGROUND OF THE INVENTION

1. Field of the Invention

The present invention relates generally to receivers which can be used for digital radio communication systems or sonar detection systems, and more specifically to a decision feedback equalizer with an array of antennas, or sensors for canceling multipath components of a signal received via time-varying multipath-fading channels.

2. Description of the Related Art

The combined use of art array of spaced antennas, or sensors with a decision feedback equalizer for canceling multipath-fading related intersymbol interference is known, as shown and described in EP-A 604, 956, published on Jan. 6, 1994. Using the well known least mean square (LMS) algorithm, the main lobe of the antennas is oriented in the arrival direction of a target signal, while forming a null in the direction of an undesired signal. However, if multipath components are arriving through very long return paths, their delay times are likely to exceed the length of the upped-delay line of the equalizer, and hence no equalization would result at ill. In particular, as the data transmission speed of a channel grows faster, the delay profile of the transmitted signal normalized by modulation speed extends, increasing the severity of the problem.

SUMMARY OF THE INVENTION

It is therefore an object of the present invention to provide a decision feedback equalizer capable of canceling multipath-fading related intersymbol interference caused by very long multipath fading channels without increasing the length of the equalizer and canceling interference from jamming sources.

Another object of the present invention is to provide a solution to a collision problem that occurs when multipath components (echoes) of an earlier transmitted symbol arrive at the equalizer simultaneously with those of a later transmitted symbol.

According to a first aspect of the present invention, there is provided a decision feedback equalizer comprising sensor means for receiving transmitted signals and recovering baseband symbols from the received signals, forward filter means for weighting the recovered baseband symbols with first coefficients so that precursor multipath components of a transmitted symbol are canceled and combining the weighted baseband symbols to produce an output signal, a plurality of first delay means for providing delays to one of the baseband symbols of the sensor means to produce a short-delayed baseband symbol and a long-delayed baseband symbol, a plurality of correlator means for detecting correlations between the one of the baseband symbols and the short- and long-delayed baseband symbols, and a plurality of second delay means for providing delays to a decision symbol to produce a short-delayed decision symbol and a long-delayed decision symbol. Selector means is responsive to a correlation detected by one of the correlator means for selecting one of the short- and long-delayed decision symbols of the second delay means. Feedback filter means shifts the delayed decision symbol selected by the selector means along a tapped-delay line to produce successively shifted decision symbols, weighting the successively shifted decision symbols with second coefficients and combining the weighted decision symbols to produce an output signal that cancels postcursor multipath components of the transmitted symbol. The output signals of the forward and feedback filter means are combined to produce a pre-decision symbol. Decision means produces a decision output from the pre-decision symbol and applies the decision output to the plurality of second delay means as said decision symbol.

According to a second aspect of the present invention, there is provided a decision feedback equalizer comprising sensor means for receiving transmitted signals and recovering therefrom baseband symbols, forward filter means for weighting the recovered baseband symbols with first coefficients so that precursor multipath components of a transmitted symbol are canceled and combining the weighted baseband symbols to produce an output signal, first delay means for providing a long delay to one of the baseband symbols from the sensor means to produce a long-delayed baseband symbol, first correlator means for detecting a correlation between the one of the baseband symbols and the long-delayed baseband symbol, second delay means for providing a long delay to a decision symbol to produce a long-delayed decision symbol, and third delay means for providing a first short delay to a decision symbol to produce a first short-delayed decision symbol. Selector means is responsive to the correlation detected by the first correlator means for selecting the long-delayed decision symbol of the second delay means. Feedback filter means multiplies the first short-delayed decision symbol from the third delay means by a second coefficient to produce a first output signal that cancels a postcursor multipath component of the transmitted symbol, and successively shifts the long-delayed decision symbol selected by the selector means along a tapped delay line to produce successively shifted decision symbols, multiplies the successively shifted decision symbols by third coefficients, and combines the multiplied decision symbols to produce a second output signal that cancels postcursor multipath components of an earlier-transmitted symbol. The output signals of the forward and feedback filter means are combined to produce a pre-decision symbol, which is fed to decision means to produce a decision output which is applied to the second and third delay means as said decision symbol.

BRIEF DESCRIPTION OF THE DRAWINGS

The present invention will be described in further detail with reference to the accompanying drawings, in which.

DETAILED DESCRIPTION

Figure 1:
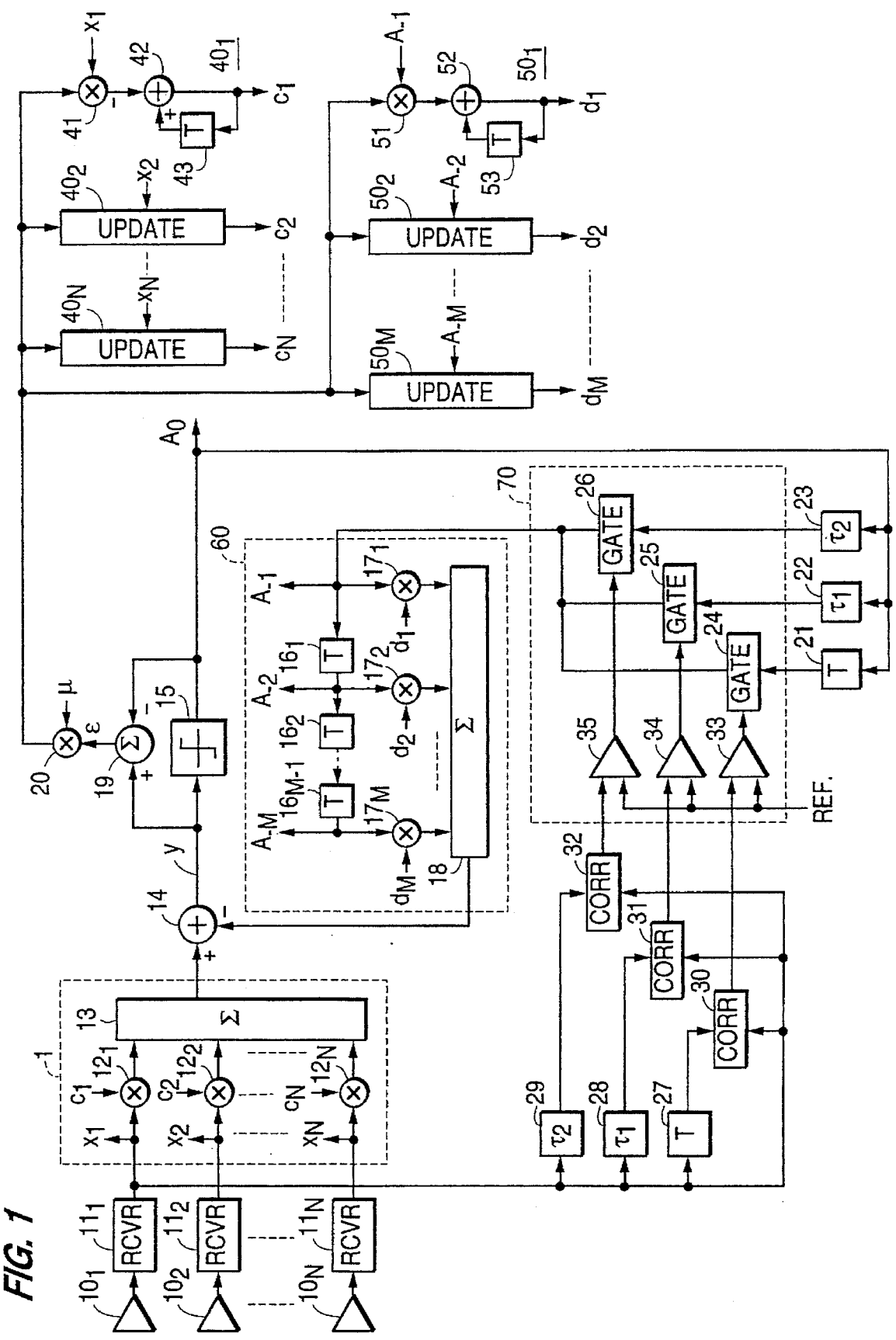
FIG. 1 is a block diagram of a decision feedback equalizer using an adaptive filter array according to an embodiment of the present invention.

Referring now to FIG. 1, there is shown a DFE (decision feedback equalizer) receiver according to a first embodiment of the present invention. The receiver of this invention is most suitably used for applications such as digital radio communication system or sonar detection systems where the quality of a transmitted signal is seriously affected by multipath components of the signal. At the transmit site, a symbol sequence {... $a_{-1}$, $a_0$, $a_{+1}$ ...} is quadrature-modulated onto a carrier in a format such as phase shift keying and transmitted. The receiver of this invention comprises an array of antennas $10_1$-$10_N$ spaced at half-wavelength intervals of the transmitted carrier, a plurality of receivers $11_1$-$11_N$, and an adaptive array filter 1 formed by a plurality of complex multipliers $12_1$-$12_N$ and an adder 13. The outputs of antennas $10_1$-$10_N$ are connected respectively to receivers $11_1$-$11_N$ where they are quadrature-demodulated, recovering baseband vectors $x_1$, $x_2$, ... $x_N$. These baseband vectors are applied to complex multipliers $12_1$-$12_N$, where they are respectively multiplied by weight coefficients $c_1$, $c_2$, ... $c_N$ supplied from coefficient update circuits $40_1$-$40_N$, so that precursors (future symbols) of multipath-fading related intersymbol interference are canceled. The weighted vectors are summed together in combiner 13.

The output of the adaptive array filter 1 is applied to a subtractor 14 where it is combined with a postcursor canceling signal supplied from a feedback filter 60 to produce an equalized output vector "y" at the output of subtractor 14. The output of subtractor 14 is coupled to a decision circuit 15 for making a decision in favor of logic-1 or logic-0 depending on the result of a comparison with a threshold value, producing a sequence of estimated symbols {$a_i$}.

An error detector 19 is connected across the input and output of decision circuit 15 to detect a decision error t which is suitably weighted by a correction factor µ in a multiplier 20 and supplied to update circuits $40_1$-$40_N$. Each update circuit 40 includes a complex correlator 41 in which the weighted decision error µ·ε is multiplied by the corresponding incoming symbol $x_i$* (where (*) represents the complex conjugate, and i=1, 2, ..., N). The weight coefficient $c_i$ is produced by coupling the output of correlator 31 to the negative input of a subtractor 42 and applying its output through a symbol delay (T) element 43 to the other input of subtractor 42 forming a feedback loop so that it operates according to the LMS (least mean square) algorithm $c_i^n = c_i^{n-1} - \mu x_i^* \epsilon$ (where n is the time indicator) and hence the mean square value of the decision error ε is reduced to a minimum. Note that the decision circuit 15, decision error detector 19, feedback filter 60 and tap-weight update circuits $50_1$-$50_N$ form a decision feedback equalizer.

Postcursors (previous symbols) of multipath-fading related intersymbol interference are canceled by coupling the output of decision circuit 15 to the feedback filter 60 through a selector circuit 70.

The feedback filter 60 comprises an M-stage tapped-delay line having symbol-delay elements $16_1$-$16_M$. When transmitted symbol $A_0$ is reproduced at the output of decision circuit 15, M past decision output symbols $A_{-1}$, $A_{-2}$, ... $A_{-M}$ appear at the successive taps of the M-stage delay line and are presented to complex multipliers $17_1$, $17_2$, ..., $17_M$, respectively, where they are weighted by rap-weight coefficients $d_1$, $d_2$, ..., $d_M$, respectively. The weighted tap signals ate summed in an adder 18 to produce a postcursor canceling signal which is applied to the subtractor 14 a where it is subtracted from the output of adder 13.

The tap-weight coefficient $d_j$ (where j=1, 2, ..., M) is produced according to the LMS algorithm $d_j^n = d_j^{n-1} \mu+A-j^* \epsilon$. Specifically, the output of the decision error detector 19 is coupled to tap-weight update circuits $50_1$-$50_M$. Each update circuit 50 includes a correlator 51 for multiplying the weighted decision error µ·ε by complex conjugate of past decision output symbol $A_{-j}$, the output of correlator 51 being coupled to one input fan adder 52 whose output is connected through a symbol delay (T) element 53 to fie other input of adder 52.

The DFE of the present invention includes a plurality of delay elements 21, 22 and 23. One of the outputs of delay elements 21, 22, 23 is selected by selector circuit 70. Delay elements 21, 22 and 23 are connected to the output of decision circuit 15 to provide a delay time corresponding to T, $\tau_1$ and $\tau_2$, respectively, to decision symbol $A_0$. Note that the delay time $\tau_1$ is greater than M×T, i.e., greater than the total delay time of feedback filter 60. The delay time $\tau_2$ is also greater than $\tau_1$. Delay times T, $\tau_1$ and $\tau_2$ are the delay times of multipath components of a transmitted symbol $a_0$ and the T-delayed multipath component is a near-field reflection and the $\tau_1$-and $\tau_2$-delay times are far-field reflections propagating over long paths. The occurrences of these far-field components are known in advance from experiments. Typically, $\tau_1$ and $\tau_2$ are 100T and 200T, respectively.

A plurality of delay elements 27, 28 and 29 are connected to the output of receiver $11_1$ to provide delays T, $\tau_1$ and $\tau_2$, respectively, to the received baseband symbol $x_1$.

Correlations between the symbol $x_1$ and the outputs of delay elements 27, 28 and 29 are detected by correlators 30, 31 and 32, respectively. If multipath components of&lays T, $\tau_1$ and $\tau_2$ exists for a given transmitted symbol and arrive in sequence, correlators 30, 31 and 32 will sequentially produce their output signals.

Selector 70 includes comparators 33, 34 and 35 and gates 24, 25 and 26. Comparators 33, 34 and 35 are connected to the outputs of correlators 30, 31, 32, respectively, for making comparisons with a predetermined reference value, and supply their outputs to gates 24, 25, 25, respectively. If the output of a corresponding correlator exceeds the reference value, each comparator supplies a gate-on pulse to the associated gate for coupling a delayed decision symbol to the feedback filter 60.

Assume that a transmitted symbol $a_0$ has a multipath component arriving at an instant delayed by symbol interval T with respect to the symbol $a_0$, a correlation is detected between them by correlator 30 and a gate-on pulse is supplied from comparator 33 to gate 24 to pass the output of delay element 21 to the feedback filter 60. Therefore, a decision output symbol $A_0$ corresponding to the transmitted symbol $a_0$ appears at the output of delay element 21 as a past symbol $A_{-1}$ time-coincident with the detection of the corresponding T-delayed multipath component by correlator 30. This past symbol is applied through gate 24 to the first tap of feedback filter 60, where it is weighted by coefficient $d_1$ for coupling to adder 18, a postcursor canceling output $A_{-1}$ $d_1$ at the output of adder 18. Using this a canceling signal, the T-delayed multipath component is canceled at the output of subtractor 14.

The decision symbol $A_{-1}$ will then be shifted from delay element $16_1$ to the next element $16_2$ and appears at the second tap as a past decision a symbol $A_{-2}$ and weighted by coefficient $d_2$. If there is a 2T-delayed multipath component associated with the transmitted symbol $a_0$, the update circuit 50-2 will update the coefficient $d_2$ using the weighted decision error µ·ε and so the past symbol $A_{-2}$ is weighted with the updated coefficient $d_2$, producing a canceling signal. Thin canceling signal is time coincident with the 2T-delayed multipath component which appears at the output of combiner 13 at the instant two symbols delayed with respect to the symbol $a_0$. A 3T-delayed multipath component, if present, will be canceled in a similar manner by a canceling signal $A_{-3}$ $d_3$.

Therefore, multipath components of a given transmitted symbol are canceled in this manner insofar as their longest delay does not exceed the total delay time of feedback filter 60.

Quantitative analysis of the cancellation of multipath components whose longest delay does not exceed the total delay time of feedback filter 60 will be given below using simultaneous linear equations. It will also be shown that the adaptive array filter 1 operates in the same manner as a feedforward filter which usually forms part of a decision feedback equalizer.

First, the output "y" of subtractor 14 is given in the form:

$$y = [c_1, c_2, \ldots c_N] \begin{bmatrix} x_1 \\ x_2 \\ \cdot \\ \cdot \\ \cdot \\ x_N \end{bmatrix} + [d_1, d_2, \ldots d_M] \begin{bmatrix} A_{-1} \\ A_{-2} \\ \cdot \\ \cdot \\ \cdot \\ A_{-M} \end{bmatrix} \quad (1)$$

Since the past decision symbol can be approximated as a transmitted symbol if the symbol error rate can be ignored, the decision error $\epsilon$ is given by:

$$\epsilon = y - a_0 \quad (2)$$

The weight coefficients $c_i$ and $d_j$ that minimize the mean square value of decision output e are determined by a normal equation (Wiener-Hoph Equation) using the orthogonality principle. From the following relations, the normal Equation can be derived, using linear weight coefficients as unknown variables.

$$E[\epsilon \cdot x_i^*] = 0 (i=1,2,\ldots,N) \quad (3)$$

$$E[\epsilon \cdot a_j^*] = 0 (j=-1,-2,\ldots,-M) \quad (4)$$

where E represents the expectation.

Figure 2:
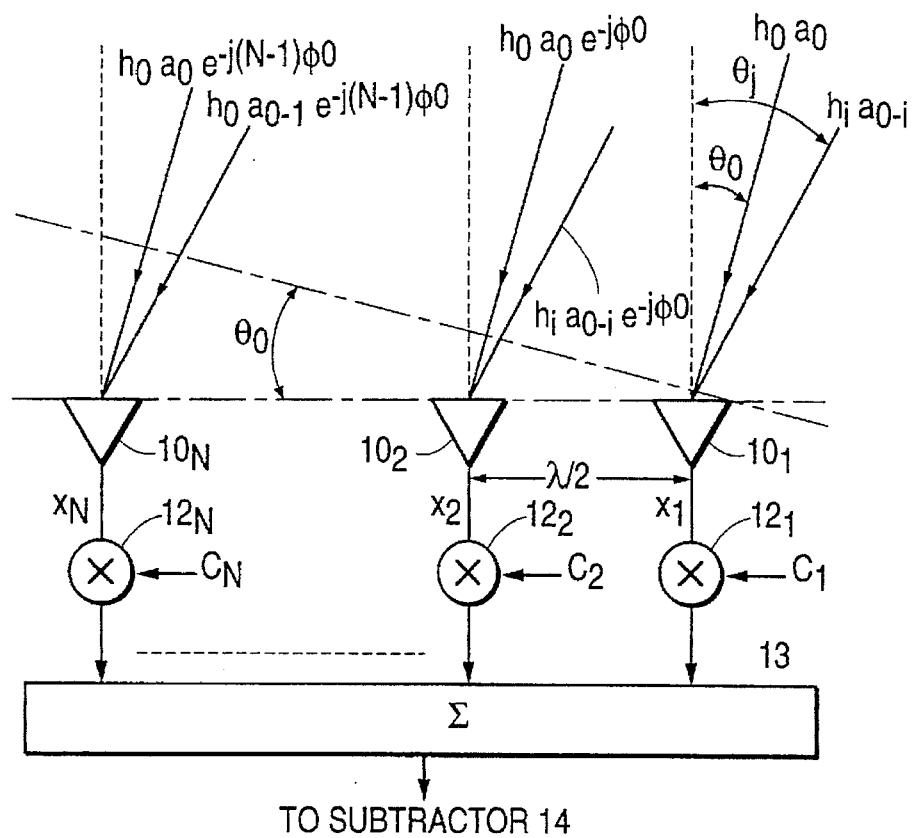
FIG. 2 is a diagram illustrating a simplified antenna array.

A simplified antenna array of the embodiment of FIG. 1 is illustrated in FIG. 2 to derive the normal equation using a simplified dispersive propagation model. Let $h_i$ represent the impulse response of a propagation path, with $h_0$ representing a reference impulse response for the symbol of interest. The impulse responses $h_{-i}$ and $h_{+i}$ represent the precursor and the postcursor, respectively. The received signals are represented by convolution of the transmitted symbol sequence $\{a_i\}$ and the impulse response $h_i$. The main signal component $S_i$ received by each antenna is given by $h_0$ $a_0$ and a multipath component received by each antenna is given by $h_i$ $a_{0-i}$.

Because of the ½ antenna spacing, the main signal component $S_i$ received by antenna $10_i$ is delayed by an amount equal to exp $\{-j(i-1)\phi_0\}$ with respect to the main component $S_1$ received by the first antenna $10_1$, where $\phi_0$ is the angle of arrival of the main signal $S_i$ to the axis of each antenna and is given by $\phi_0 = \pi \sin \theta_0$. Therefore, the baseband vectors $x_i$ are represented as follows:

$$x_i = \sum_{n=-\infty}^{+\infty} h_n \exp[-j(i-1)\phi_n] a_{0-n} + n_i \quad (5)$$

where $n_i$ is the noise contained in the output of antenna $10_i$ and $\phi_n$ represents the angle of arrival of a multipath signal component corresponding to the n-th impulse response of the dispersive propagation model and is given by $\phi_n = \pi \sin \theta_n$. From Equations (3) and (4), the normal Equation is given as follow:

$$\begin{bmatrix} \Psi_{pq} & -H^* \\ H^T & -I \end{bmatrix} \begin{bmatrix} C \\ D \end{bmatrix} = \begin{bmatrix} S \\ 0 \end{bmatrix} \quad (6)$$

where, C and D are in the form $$C = \begin{bmatrix} c_1 \\ c_2 \\ \cdot \\ \cdot \\ \cdot \\ c_N \end{bmatrix}, D = \begin{bmatrix} d_1 \\ d_2 \\ \cdot \\ \cdot \\ \cdot \\ d_M \end{bmatrix} \quad (7)$$

$\Psi_{pq}$ represents the N×N correlation matrix of signals received by antennas $10_1$–$10_N$ and the elements of this matrix are given by:

$$\Psi_{pq} = \left[ \sum_{n=-\infty}^{+\infty} h_n^* h_n \cdot \exp\{j(p-q)\phi_n\} \cdot \sigma^2 \cdot \delta_{pq} \right] \quad (8)$$

where $p,q=1,2,\ldots,N$, $\sigma^2$ is the noise power, $\delta_{pq}$ is the Kronecker's delta which equals 1 if $\pi=\theta$ or 0 if $\pi \neq \theta$, I is an M×M unit matrix, and 0 is an M-th order zero vector, H is the N×M correlation matrix of the feedback filter 60 given by Equation (9), and S is a correlation vector correlating the symbol vector $(x_1, x_2, \ldots x_n)$ with the decision output symbol as given by Equation (10).

$$H = \begin{bmatrix} h_1 & \ldots & h_M \\ h_1 \cdot \exp\{-j\phi_1\} & \ldots & h_M \cdot \exp\{-j\phi_M\} \\ h_1 \cdot \exp\{-j2\phi_1\} & \ldots & h_M \cdot \exp\{-j2\phi_M\} \\ \cdot & \ldots & \cdot \\ \cdot & \ldots & \cdot \\ \cdot & \ldots & \cdot \\ h_1 \cdot \exp\{-j(N-1)\phi_1\} & \ldots & h_M \cdot \exp\{-j(N-1)\phi_M\} \end{bmatrix} \quad (9)$$

$$S = h_0 * \begin{bmatrix} 1 \\ \exp\{j\phi_0\} \\ \exp\{j2\phi_0\} \\ \cdot \\ \cdot \\ \cdot \\ \exp\{j(N-1)\phi_0\} \end{bmatrix} \quad (10)$$

Equation (6) indicates that the operation of the antenna array and the feedback filter is represented by simultaneous linear equations and that the antenna array functions as a feedforward filter of the decision feedback equalizer. Therefore, the present invention is not simply a sum of, but an integrated combination of, an antenna array and a decision feedback equalizer.

A computer simulation was made for evaluating the present invention in terms of the directivity pattern of the antenna array which is given by:

$$P(\theta) = |C^T \cdot \Gamma| = \left| \sum_{n=1}^{n=N} c_n \cdot \exp\{-j(n-1)\phi(\theta)\} \right|$$

where, $\Gamma$ is a unit DC signal vector that is assumed to be arriving at antennas $10_1$–$10_N$ at an angle q and is given by:

$$\Gamma^T = 1 \cdot [1 \exp\{-j\phi(\theta)\} \ldots \exp\{-j(N-1)\phi(\theta)\}] \quad (12)$$

where $\phi(\theta) = \pi \sin \theta$.

In the computer simulation, a four-element antenna array (each element with a 10 dB signal-to-noise ratio) and a single-delay tap feedback filter were used for a three-wave multipath fading model by representing a main signal as $h_0$ $a_0$, a phase-advanced multipath component as $h_{-1}$ $a_{+1}$, and a phase-lagged multipath component as $h_{+1}$ $a_{-1}$, and setting the amplitude of the impulse responses to a unit value (i.e., $|h_{-1}|=|h_0|=|h_{+1}|=1$, which represents the worst situation where the frequency selective fade is dominant) and setting the arrival angle of the main signal ($\theta_0$), phase-advanced and lagged multipath components ($\theta_{-1}$) and ($\theta_{+1}$) as $\theta_0=20°$, $\theta_{-1}=45°$ and $\theta_{+1}=20°$, respectively. For purposes of comparison, a simulation was further made on a prior an four-element adaptive array receiver having no feedback filter, using the same operating parameters just described. Results of the computer simulations are shown in FIGS. 3A and 3B.

Figure 3A:
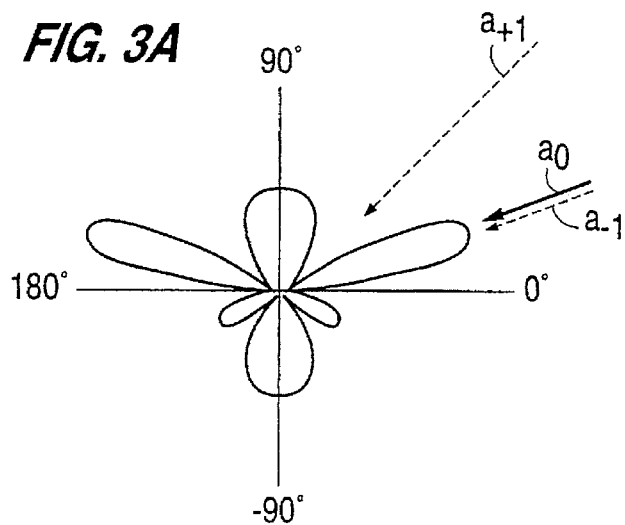
FIGS. 3A and 3B show antenna patterns obtained respectively by computer simulations of the equalizer of the present invention and a prior equalizer having no feedback filter.
Figure 3B:
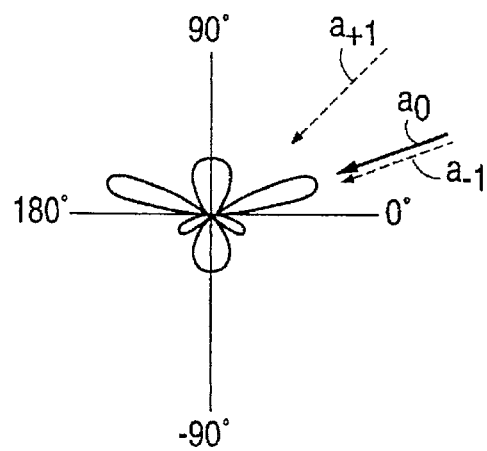

The antenna pattern shown at FIG. 3A is the result of the simulation derived from a four-element antenna array according to the present invention. It is seen that the main lobe is oriented in the arrival direction ($\theta=20°$) of the main signal and a null point (a point of zero gain) is formed in the arrival direction of the phase-advanced multipath component. While the phase-lagged multipath component $h_{+1}$ $a_{-1}$ is summed with the main signal, it is cancelled with an estimate of the symbol $a_{-1}$ derived from the first delay-line tap of the feedback filter. It is therefore seen that, regardless of the presence of multipath components of a desired signal, the directivity pattern of the antenna array is constantly oriented in the arrival direction of the main component of the desired signal so that it is received at a maximum signal-to-noise ratio. On the other hand, the directivity pattern shown at FIG. 3B is the result of simulation derived from the prior art adaptive array receiver. Since the prior art receiver has no feedback filter and provides cancellation by forming null points in the antenna pattern, it is impossible to cancel the phase-lagged multipath component $h_{+1}$ $a_{-1}$ from the main component with which it is received with the same antenna gain, As a result, the reduction of the phase-lagged multipath component would cause the antenna gain to be reduced at the cost of the main signal.

If the delay time of multipath components exceed the total delay time of the feedback filter, no equalization proceeds in the feedback filter until correlation is detected again. Under such conditions, the normal equation is given in the form:

$$\begin{bmatrix} \Psi_{pq} & 0 \\ 0 & -I \end{bmatrix} \begin{bmatrix} C \\ D \end{bmatrix} = \begin{bmatrix} S \\ 0 \end{bmatrix} \quad (13)$$

Such conditions correspond to a receiver having no feedback filter, where an antenna pattern similar to that of FIG. 3B would result.

Multipath components whose delay times exceed the total delay time of the feedback filter 60 may be few or nonexistent under normal multipath fading environment. However, very long delay paths may exist in a particular situation such as sonar and the like and multipath components coming through such long paths experience delays equal to or greater than $\tau_1$. Therefore, if there is a $\tau_1$-delayed multipath component for a given transmitted symbol $a_0$, a correlation is detected between $a_0$ and the $\tau_1$ component by correlator 31 and a gain-on pulse is supplied from to gate-on pulse is supplied from comparator 34 to gate 35 to pass the output of T-delay element 22 to the feedback filter 60. Therefore, a decision output symbol $A_0$ corresponding to the transmitted symbol $a_0$ appears at the output of delay element 22 simultaneously with the time of detection of the corresponding $\tau_1$-delayed multipath component. This past symbol is applied through gate 25 to the first tap of feedback filter 60 as a past symbol $A_{-\tau_1}$, where it is weighted by coefficient $d_1$, producing a postcursor canceling signal $A_{-\tau_1} \cdot d_1$ at the output of adder 18. Using this signal, subtractor 14 cancels the $\tau_1$-delayed multipath component. If the $\tau_1$-delayed multipath component is followed by a series of multipath components at successive T (symbol) intervals, such multipath components will be adaptively canceled as the decision symbol $A_{-\tau_1}$ is successively shifted along the tapped-delay line of the feedback filter. This process continues until the decision symbol $A_{-\tau_1}$ appears as $A_{-(\tau_1 - M)}$ at the end of the tapped-delay line of the feedback filter. This process can be represented by the following normal equation:

$$\begin{bmatrix} \Psi_{pq} & 0 & -H^* \\ 0 & 0 & 0 \\ H^T & 0 & -1 \end{bmatrix} \begin{bmatrix} C \\ D \\ D' \end{bmatrix} = \begin{bmatrix} S \\ 0 \\ 0 \end{bmatrix} \quad (14)$$

where, D' indicates the vector of rap-weight coefficients $d_i$ of the feedback filter when the $\tau_1$-delayed symbol is being shifted along its tapped-delay line, and D indicates the vector of tap-weight coefficients $d_i$ of the feedback filter when the T-delayed symbol is being shifted along its tapped-delay line. The vector D no longer exists when D' exists and hence D=0 in Equation (14). It is seen from Equation (14) that the size of the correlation matrix of Equation (13) is extended from (N+M)×(N+M) to (N+M+$\tau_1$)×(N+M+$\tau_1$).

Similar events occur when multipath components of a transmitted symbol return at instants delayed by mount equal to $\tau_2$ or greater.

The multipath components of an earlier-transmitted symbol may arrive at the same instants as a significant multipath component of the most recent symbol. Under such circumstances, correlations will be simultaneously detected by correlators 30 and 31 to open the gates 24 and 25. When this occurs, equalization cannot proceeds in the feedback filter of FIG. 1.

Figure 4:
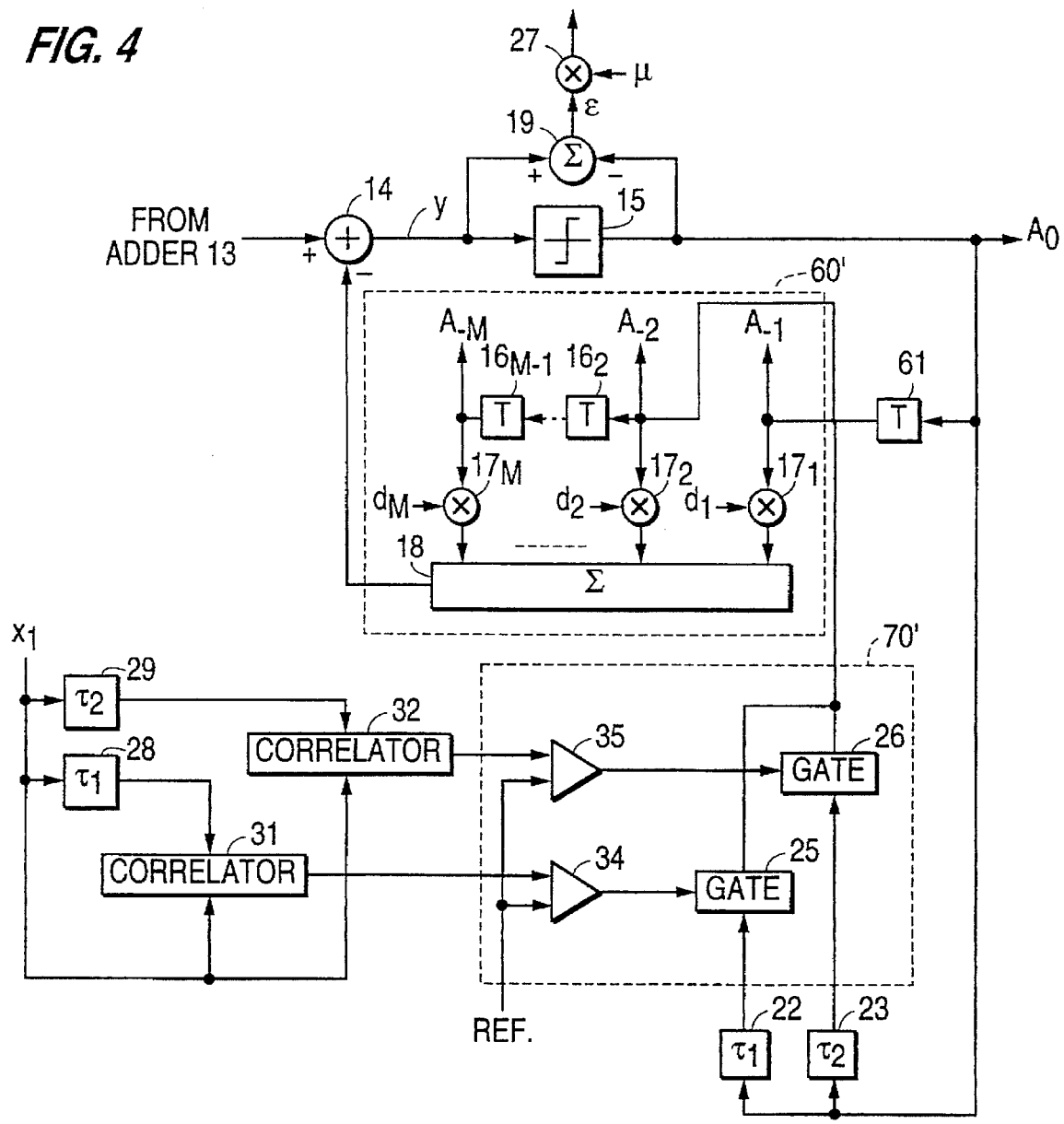
FIG. 4 is a block diagram of a modified decision feedback equalizer of the present invention.

A solution to this problem is illustrated in FIG. 4 as a modification of the first embodiment of this invention. According to this embodiment, the modified DFE receiver includes feedback filter 60' and includes only delay elements 22, 23, 28, 29 and correlators 31, 32. Modified selector circuit 70' includes only comparators 34, 35 and gates 25, 26. This embodiment further differs in that the output of decision circuit 15 is connected through a T-delay element 61 to the first tap of the feedback filter 60' and to the of delay elements 22, 23. The first and second taps of feedback filter 60' are separated from each other, and the output of selector circuit 70' is connected to the second tap of the filter 60'.

Since it is known that a T-delayed multipath component is the dominant component, it is sufficient to take account only of this component in a situation where it is usually likely to collide with a multipath component that propagates over a very long path. The output of delay element 61 is the decision symbol corresponding to such a T-delayed multipath component. The output of this delay element is coupled to multiplier $17_1$ where it weighted by coefficient $d_1$, producing a signal for canceling the T-delayed multipath component at the output of subtractor 14. Simultaneously with the arrival of the T-delayed multipath component, a $\tau_1$-delayed multipath component of a previous symbol is received and correlation is detected by correlator 31, resulting in the gate 25 being open to pass the $\tau_1$-delayed decision symbol $A_{-\tau_1}$ to the second tap of feedback filter 60' where it is multiplied by coefficient $d_2$ in the multiplier $17_2$, providing a signal for canceling the $\tau_1$-delayed multipath component at the output of subtractor 14. Multipath components arriving at successive T-intervals following the $\tau_1$-delayed multipath component are canceled as the $\tau_1$-delayed decision symbol is shifted along the feedback filter 60'. Similar events occur with respect to a $\tau_2$-delayed multipath component and those following it. In this case, correlator 32 produces an output which opens the gate 26 to pass the output of delay element 23 to the second tap of filter 60'.

In this modified embodiment, the output signal Z of the feedback filter 60' is given as follows:

$$Z = -d_1 \cdot A_{-1} - \sum_{i=L}^{+\infty} d_i \cdot A_{0-i} \quad (15)$$

where L corresponds to $\tau_1$ or $\tau_2$. It is seen that the first term of Equation (15) represents the output of feedback filter 60' for canceling the T-delayed multipath component associated with the transmitted symbol $a_0$, the second term representing the filter output when canceling those components associated with the previously transmitted symbol $a_{-\tau_1}$ or $a_{-\tau_2}$.

Figure 5:
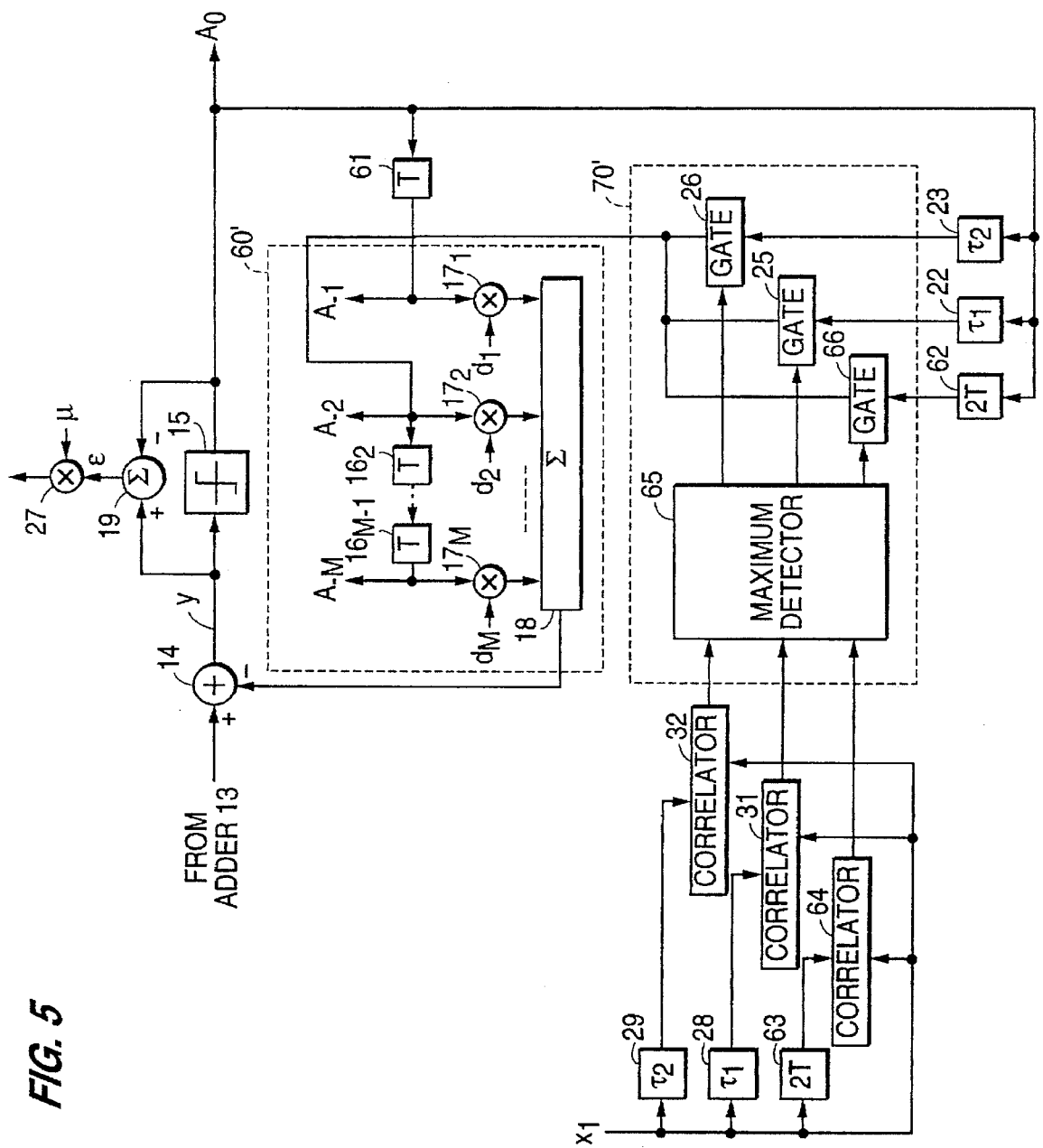
FIG. 5 is a block diagram of a further modification of the present invention.

If there is a 2T-delayed multipath component of substantial magnitude in addition m the T-delayed component, an embodiment shown in FIG. 5 is suitable. This embodiment is similar to those of the FIG. 4 embodiment with the exception that it includes delay elements 62 and 63 of 2T-delay time, a correlator 64 and a gate 66. Correlator 64 provides detection of a correlation between the symbol $x_1$ and the output of delay 63 and gate 66 is connected between delay 62 and the second input of feedback filter 60'. Since there is a likelihood of the 2T-delayed multipath component time-coincident with a multipath component associated with an earlier-transmitted symbol $a_{-\tau_1}$ or $a_{-\tau_2}$, selector 70" includes a maximum detector 65 for comparing the outputs of correlators 64, 31 and 32 with each other to find which one has the highest correlation value and supply a gate-on pulse to one of gates 66, 25 and 26 corresponding to the correlator that produces the highest correlation value.

In this way, the multipath component of highest magnitude is selected in preference over other simultaneously arriving multipath components and the associated delayed decision symbol is selected in preference over other delayed decision symbols by selector circuit 70" and applied to the second tap of feedback filter 60', which cancels the highest magnitude multipath component at the output of subtractor 14.

What is claimed is:

1. A decision feedback equalizer comprising:

sensor means for receiving transmitted signals and recovering baseband symbols from the received signals;

forward filter means for weighting the recovered baseband symbols with first coefficients so that precursor multipath components of a transmitted symbol are canceled and combining the weighted baseband symbols to produce an output signal;

a plurality of first delay means for providing delays to one of said baseband symbols of the sensor means to produce a short-delayed baseband symbol and a long-delayed baseband symbol;

a plurality of correlator means for detecting correlations between said one of the baseband symbols and said short- and long-delayed baseband symbols;

a plurality of second delay means for providing delays to a decision symbol to produce a short-delayed decision symbol and a long-delayed symbol;

selector means responsive to a correlation detected by one of said correlator means for selecting one of the short- and long-delayed decision symbols of the second delay means;

feedback filter means for shifting the delayed decision symbol selected by the selector means along a tapped-delay line to produce successively shifted decision symbols, weighting the successively shifted decision symbols with second coefficients and combining the weighted decision symbols to produce an output signal that cancels postcursor multipath components of said transmitted symbol;

means for combining the output signals of said forward filter means and said feedback filter means to produce a pre-decision symbol; and decision means for producing a decision output from the predecision symbol and applying the decision output to said plurality of second delay means as said decision symbol.

2. A decision feedback equalizer as claimed in claim 1, wherein said sensor means comprises an array of spaced sensors, further comprising:

decision error detector means connected to said decision means for detecting a decision error contained in the decision symbol;

a plurality of first update circuits for producing a plurality of weight coefficients from the baseband symbols of said sensors and the decision error of said decision error detector means and supplying said weight coefficients to said forward filter means as said first coefficients; and a plurality of second update circuits for producing a plurality of tap-weight coefficients from said successively shifted decision symbols of said feedback filter means and the decision error of said decision error detector means and applying the tap-weight coefficients to said feedback filter means as said second coefficients.

3. A decision feedback equalizer comprising:

sensor means for receiving transmitted signals and recovering therefrom baseband symbols;

forward filter means for weighting the recovered baseband symbols with first coefficients so that precursor multipath components of a transmitted symbol are canceled and combining the weighted baseband symbols to produce an output signal;

first delay means for providing a long delay to one of said baseband symbols from the sensor means to produce a long-delayed baseband symbol;

first correlator means for detecting a correlation between said one of the baseband symbols and the long-delayed baseband symbol;

second delay means for providing a first short delay to a decision symbol to produce a first short-delayed decision symbol;

third delay means for providing a first short delay to a decision symbol to produce a first short-delayed decision symbol;

selector means responsive to the correlation detected by said first correlator means for selecting the long-delayed decision symbol of said second delay means;

feedback filter means for weighting said first short-delayed decision symbol from said third delay means (61) with a second coefficient to produce a first output signal that cancels a postcursor multipath component of said transmitted symbol, and successively shifting said long-delayed decision symbol selected by the selector means along a tapped delay line to produce successively shifted decision symbols, weighting the successively shifted decision symbols with third coefficients, and combining the weighted decision symbols to produce a second output signal that cancels postcursor multipath components of a symbol transmitted earlier than said transmitted symbol;

means for combining the output signals of said forward filter means and said feedback filter to produce a pre-decision symbol; and decision means for producing a decision output from the predecision symbol and applying the decision output to said second and third delay means as said decision symbol.

4. A decision feedback equalizer as claimed in claim 3, further comprising:

fourth delay means for providing a second short delay to said one of the baseband symbols to produce a second short-delayed baseband symbol;

second correlator means for detecting a correlation between said one of the baseband symbols and said second short-delayed baseband symbol;

fifth delay means for providing a second short delay to said decision symbol from said decision means to produce a second short-delayed decision symbol;

wherein said selector means comprises maximum detector means for comparing output signals of said first and second correlator means and producing an output signal indicating which one of the output signals has a highest magnitude; and a plurality of gates responsive to the output signal of said maximum detector means for applying one of the long-delayed decision symbol and the second short-delayed decision symbol to said feedback filter means.

5. A decision feedback equalizer as claimed in claim 3, wherein said sensor means comprises an array of spaced sensors, further comprising:

decision error detector means connected to said decision means for detecting a decision error contained in the decision symbol;

a plurality of first update circuits for producing a plurality of weight coefficients from the baseband symbols of said sensors and the decision error of said decision error detector means and supplying said weight coefficients to said forward filter means as said first coefficients; and a plurality of second update circuits for producing a plurality of tap-weight coefficients from said successively shifted decision symbols of said feedback filter means and the decision error of said decision error detector means and applying the tap-weight coefficients to said feedback filter means as said second and third coefficients.

6. A method for canceling multipath components of a transmitted symbol, comprising the steps of:

a) receiving transmitted signals and recovering baseband symbols from the received signals;

b) weighting said recovered baseband symbols by coefficients so that precursor multipath components of a transmitted symbol are canceled and combining the weighted baseband symbols to produce a first pre-decision symbol;

c) providing delays to one of said baseband symbols to produce a short-delayed baseband symbol and a long-delayed baseband symbol and providing delays to a decision symbol to produce a short-delayed decision symbol and a long-delayed decision symbol;

d) determining whether a correlation exists between said one of the baseband symbols and said short- and long-delayed baseband symbols and selecting one of the short- and long-delayed decision symbols depending on which one of said short- and long-delayed baseband symbols said correlation is detected;

e) successively shifting the decision symbol selected by step (d) along a tapped-delay line to produce successively shifted decision symbols, weighting the successively shifted decision symbols with coefficients, and combining the weighted decision symbols to produce a canceling signal which cancels postcursor multipath components of said transmitted symbol;

f) combining the canceling signal with said first pre-decision symbol of step (b) and producing a second pre-decision symbol; and g) making a decision on said second pre-decision symbol and producing a decision output and repeating step (c) by using the decision output as said decision symbol.

7. A method for canceling multipath components of a transmitted symbol, comprising the steps of:

a) receiving transmitted signals and recovering baseband symbols from the received signals;

b) weighting said recovered baseband symbols with coefficients so that precursor multipath components of a transmitted symbol are canceled and combining the weighted baseband symbols to produce a first pre-decision symbol;

c) providing a delay to one of said baseband symbols to produce a long-delayed baseband symbol and providing delays to a decision symbol to produce a short-delayed decision symbol and a long-delayed decision symbol;

d) weighting the short-delayed decision symbol of step (c) with a coefficient to produce a first canceling signal that cancels a short-delayed postcursor multipath component of said transmitted symbol;

e) determining whether a correlation exists between said one of the baseband symbols and said long-delayed baseband symbol and selecting the long-delayed decision symbol if said correlation is detected;

f) successively shifting the long-delayed decision symbol selected by step (e) along a tapped-delay line to produce successively shifted decision symbols, weighting the successively shifted decision symbols with coefficients, and combining the weighted decision symbols to produce a second canceling signal that cancels long-delayed postcursor multipath components of a symbol transmitted earlier than said transmitted symbol;

g) combining each of the first and second canceling signals with said first pre-decision symbol of step (b) and producing a second pre-decision symbol; and h) making a decision on said second pre-decision symbol and producing a decision output and repeating step (c) by using the decision output as said decision symbol.

* * * * *